J. C. LEWIS.
VEHICLE ELEVATING MECHANISM.
APPLICATION FILED JAN. 16, 1922.

1,434,390.

Patented Nov. 7, 1922.
2 SHEETS—SHEET 2.

Inventor
James C. Lewis,
by his attorney
Charles L. Gooding

Patented Nov. 7, 1922.

1,434,390

UNITED STATES PATENT OFFICE.

JAMES C. LEWIS, OF PORTLAND, MAINE.

VEHICLE-ELEVATING MECHANISM.

Application filed January 13, 1922. Serial No. 529,499.

*To all whom it may concern:*

Be it known that I, JAMES C. LEWIS, a citizen of the United States, residing at Portland, in the county of Cumberland and State of Maine, have invented new and useful Improvements in Vehicle-Elevating Mechanism, of which the following is a specification.

The device of this invention is particularly adapted for use in connection with automobiles where it is often necessary to raise the wheels to remove a tire for repairs, or to remove the wheel and the tire, all as well known to those skilled in this art.

The object of this invention is to perform these operations with the least possible labor and with the least expenditure of time, and also the object of the invention is to provide a device of the character set forth which may be operated without the expenditure of a great amount of strength and without soiling the clothing or hands of the user of the device.

To these ends the invention consists in the combination and arrangement of parts set forth in the following specification and particularly pointed out in the claims thereof.

Referring to the drawings.

Like numerals refer to like parts throughout the several views of the drawings.

Figure 4:
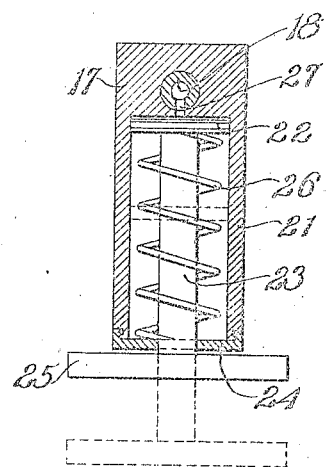
Fig. 4 is an enlarged sectional elevation taken on line 4—4 of Fig. 1.
Figure 5:
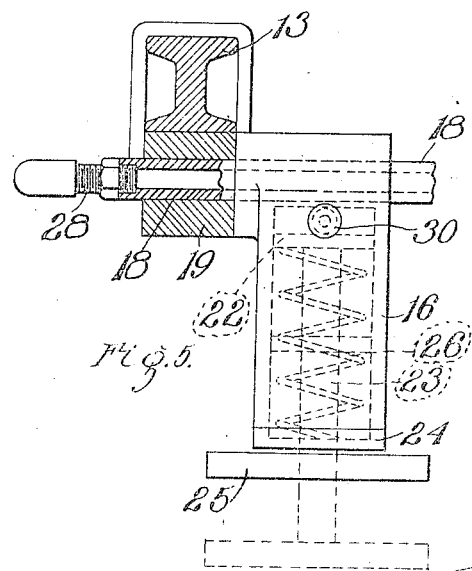
Fig. 5 is a sectional elevation taken on line 5—5 of Fig. 2 with the jack lowered into operative position.

In the drawings, 10 is the chassis of an automobile, 11 the front wheels, 12 the rear wheels, 13 the front axle and 14 the housing of the rear axle. 15 is the rear axle. 16 and 17 are two pneumatic jacks both fastened to a hollow rotary shaft 18 which entends longitudinally of the vehicle and is located midway between the opposite sides thereof. The front end of the shaft 18 is rotatably mounted in a bearing 19 fast to the front axle 13, and the jack 16 is fast to the shaft 18 immediately adjacent said bearing 19 and at the rear thereof. The rear end of the shaft 18 is rotatably mounted in a bearing 20 which is fastened to the housing 14, and the jack 17 is fastened to the shaft 18 immediately adjacent and at the rear of the bearing 20. The jack 17 is a pneumatic jack consisting of a cylinder 21, see Fig. 4, in which is mounted a piston 22 having a piston rod 23 fast thereto and extending downwardly therefrom through the head 24 of said cylinder. To the lower end of the piston rod 23 is fastened a base plate 25. A spring 26 encircles the piston rod 23 and bears at one end against the head 24 and at the other end against the piston 22. The upper end of the bore of the cylinder 21 is connected by a port 27 to the interior of the hollow shaft 18. The front end of the shaft 18 is provided with an air valve 28 of any suitable style, but preferably of the same construction and operating in the same manner as the air valve well known to those skilled in the art, which is provided on pneumatic tires for automobiles. This air valve and the shaft 18 to which it is attached may be connected to any suitable source of air under pressure, such as, for example, an air pump which is provided with many of the automobiles now on the market, or said pipe may be connected by a flexible hose to a tank of compressed air carried by the automobile, but not shown in the drawings. A flexible hose 29 of this character is illustrated in dotted lines, Fig. 1, as attached to the front end of the hollow shaft 18. The jack 16 is of similar construction and operated in the same manner as the jack 17 except that the bore of the cylinder of said jack is provided with an air valve 30 of similar construction to the air valve 28, and when it is desired to operate the jack 16 the hose 29 is attached to this air valve 30. It will, therefore, be seen that each of the jacks 16 and 17 may be operated independently of each other.

Figure 1:
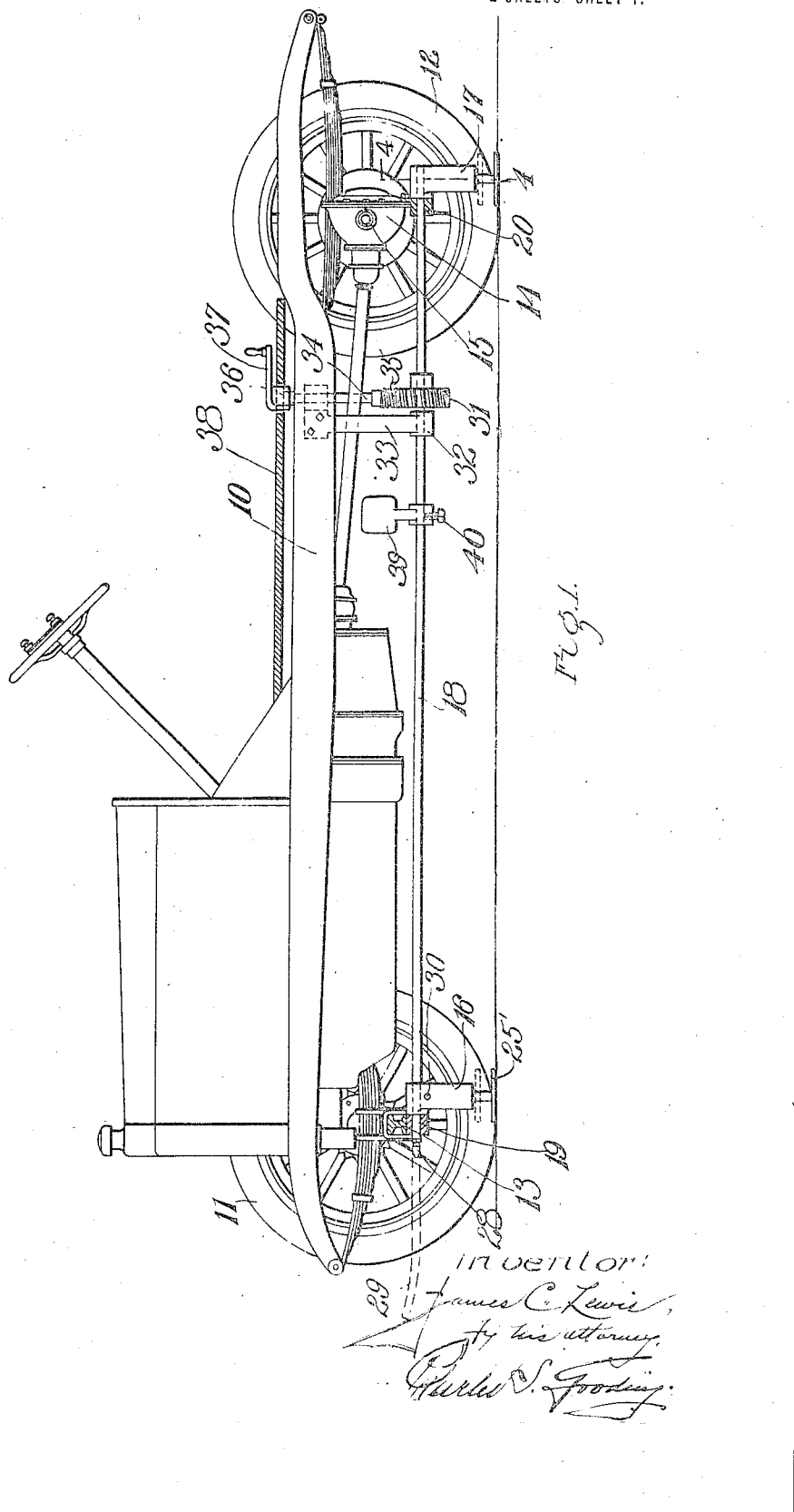
Figure 1 is a side elevation partly in section of a portion of an automobile with my improved elevating device incorporated therein.
Figure 2:
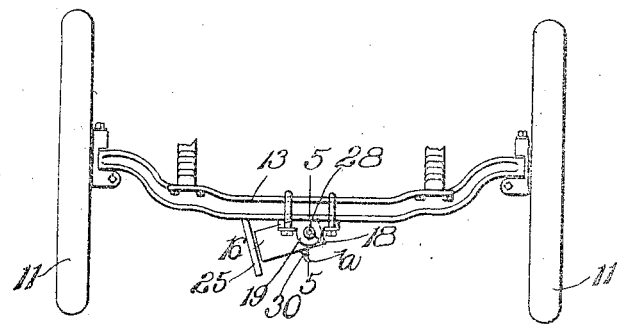
Fig. 2 is a front elevation of the same.
Figure 3:
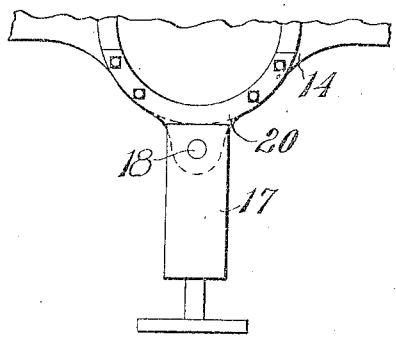
Fig. 3 is a rear elevation of one of the jacks and a portion of its supporting member.

In order to lower the jacks 16 and 17 into operative position as illustrated in Fig. 1 from the inoperative position illustrated in Fig. 2, the hollow shaft 18 has a worm gear 31 fast thereto and adjacent to the bearing 32 which is provided on a bracket 33 fast to the chassis of the automobile. A vertical shaft 34 which also has bearings in said bracket 33 is provided with a worm 35 which meshes into the worm gear 31. The upper end of the vertical shaft 34 is squared off at 36 to receive a detachable socket wrench 37 and the upper end of said shaft terminates flush with the upper surface of the floor boards 38 of the automobile body. A counter balance 39 is mounted upon the shaft 18 and secured in position thereon by means of a set screw 40.

The general operation of the mechanism hereinbefore described is as follows:—Assuming the jacks 16 and 17 to be in the raised position illustrated in Fig. 2, the socket wrench 37 is attached to the upper end of the shaft 34 and rotated by the operator in the proper direction to rotate the shaft 18 in the direction of the arrow $a$, Fig. 2. This will lower the jacks to a vertical position. If it is desired to raise the front wheels 11, the operator connects the hose 29 to the valve 30 and the hose is connected to a pump in the automobile, or if in a garage, the air hose from the air compressor is attached to the valve 30 which causes the base plate 25′ to move downwardly and after it contacts with the ground or floor upon which the automobile is resting, further downward movement of said base plate 25′ will cause both wheels to be elevated from the ground at the same time. Upon completing the work which is contemplated, the operator removes the hose from the valve 30 and pressing upon the air valve stem allows the air to pass out of the cylinder of the jack 16 and the spring 26′ of said jack will then cause the piston 22′, piston rod 23′ and base plate 25′ to move upwardly away from the ground or floor. The operator then rotates the wrench 37 in the proper direction to rotate the shaft 18 in a direction reverse to that of the arrow $a$ thus bringing the parts into the relative positions illustrated in Fig. 2.

When it is desired to raise the rear wheels 12 from the ground, the same operation is performed to position the jack 17 and compressed air is forced thereinto by attaching the hose 29 to the valve 28 and forcing air through the hollow shaft 18, port 27 and into the interior of the cylinder 21 whereupon the piston 22 will descend, compressing the spring 26 and lowering the plate 25, and, after contact with the ground or floor, cause the rear wheels to be lifted from the ground. After the rear wheels have been operated upon as desired, the hose 29 is detached from the valve 28 and the valve 28 is operated to allow the compressed air in the hollow shaft 18 and in the jack 17 to pass out of the front end of said shaft. The parts are then positioned as illustrated in Fig. 2 in the manner hereinbefore set forth.

It will be noted that the shaft 18 being rotated by a worm gear mechanism will be locked in position wherever it may be desired by rotation of the shaft 34 and by means of the socket wrench 37.

I claim:

1. A vehicle elevating mechanism having, in combination, a rotary shaft, a jack fast thereto, means to support said shaft on said vehicle with its axial line extending longitudinally of said vehicle and means to rotate said shaft whereby said jack may be lowered into operative position.

2. A vehicle elevating mechanism having, in combination, a rotary shaft, a jack fast thereto, means to support said shaft on said vehicle with its axial line extending longitudinally of said vehicle, means to rotate said shaft whereby said jack may be lowered into operative position and raised to inoperative position.

3. A vehicle elevating mechanism having, in combination, a rotary shaft, a jack fast thereto, means to support said shaft on said vehicle with its axial line extending longitudinally of said vehicle, means to rotate said shaft whereby said jack may be lowered into operative position, raised to inoperative position and locked in each of said positions.

4. A vehicle elevating mechanism having, in combination, a rotary shaft, a jack fast thereto, means to support said shaft on said vehicle with its axial line extending longitudinally of said vehicle and a worm gear mechanism adapted to rotate said shaft whereby said jack may be lowered into operative position.

5. A vehicle elevating mechanism having, in combination, a rotary shaft, a jack fast thereto, means to support said shaft on said vehicle with its axial line extending longitudinally of said vehicle and a worm gear mechanism adapted to rotate said shaft whereby said jack may be lowered into operative position, raised to inoperative position and locked in each of said positions.

6. A vehicle elevating mechanism having, in combination, a rotary shaft, a pneumatic jack fast thereto, means to operatively connect said jack to a source of compressed air, means to support said shaft on said vehicle with its axial line extending longitudinally of said vehicle and means to rotate said shaft whereby said jack may be lowered into operative position.

7. A vehicle elevating mechanism having, in combination, a hollow, rotary shaft, a pneumatic jack fast to said shaft and connecting with the interior thereof, means to support said shaft on said vehicle with its axial line extending longitudinally of said vehicle, an air valve communicating with the interior of said pipe and means to connect said air valve to a source of compressed air.

8. A vehicle elevating mechanism having, in combination, a hollow, rotary shaft; a pneumatic jack fast to said shaft and connecting with the interior thereof, means to support said shaft on said vehicle with its axial line extending longitudinally of said vehicle, an air valve communicating with the interior of said pipe, means to connect said air valve to a source of compressed air and means to rotate said shaft whereby said jack may be lowered into operative position.

9. An automobile elevating mechanism having, in combination, a rotary shaft, means to support said shaft beneath said automobile with its axial line extending longitudinally of said automobile and midway between the opposite sides thereof, a jack fast to said shaft and means to rotate said shaft whereby said jack may be lowered into operative position.

10. An automobile elevating mechanism having, in combination, a rotary shaft, a pair of jacks fast to said shaft, one adjacent the front axle of said automobile, the other adjacent the housing of the rear axle of said automobile, means to support said shaft on said automobile with its axial line extending longitudinally of said automobile and midway between the opposite sides thereof and means to rotate said shaft whereby said jacks may be lowered simultaneously into operative position.

11. An automobile elevating mechanism having, in combination, a rotary shaft, a pair of pneumatic jacks fast to said shaft, one adjacent the front axle of said automobile, the other adjacent the housing of the rear axle of said automobile, means to support said shaft on said automobile with its axial line extending longitudinally of said automobile and midway between the opposite sides thereof, means to rotate said shaft whereby said pneumatic jacks may be lowered simultaneously into operative position and means to operatively connect each of said jacks independently to a source of air under pressure.

12. An automobile elevating device having, in combination, a hollow, rotary shaft, means to support said shaft on said automobile with its axial line extending longitudinally thereof and midway between opposite sides of said automobile, a pair of pneumatic jacks fast to said shaft, one of said jacks being located adjacent the front axle of said automobile, the other of said jacks being located adjacent the housing of the rear axle of the automobile and communicating with the interior of said hollow shaft, an air valve on the jack adjacent said front axle and another air valve on one end of said shaft communicating with the interior thereof and means to connect said air valves independently of each other to a source of air under pressure.

13. A vehicle elevating mechanism having, in combination, a rotary shaft, a jack fast thereto, means to support said shaft on said vehicle with its axial line extending longitudinally of said vehicle, means to rotate said shaft whereby said jack may be lowered into operative position and a counter balance fast to said rotary shaft.

In testimony whereof I have hereunto set my hand in presence of two subscribing witnesses.

JAMES C. LEWIS.

Witnesses:
 FRANKLIN E. LOW,
 HAZEL F. LA MUDGE.